United States Patent
Takao et al.

(10) Patent No.: US 11,587,336 B2
(45) Date of Patent: Feb. 21, 2023

(54) GAZE TARGET DETECTOR (71) Applicant: SUBARU CORPORATION, Tokyo (JP)

(72) Inventors: Hideyuki Takao, Tokyo (JP); Tatsuo Kano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/172,217

(22) Filed: Feb. 10, 2021

(65) Prior Publication Data
US 2021/0295070 A1 Sep. 23, 2021

(30) Foreign Application Priority Data

Mar. 17, 2020 (JP) .............................. JP2020-046264
Sep. 9, 2020 (JP) .............................. JP2020-151199

(51) Int. Cl.
*G08B 21/06* (2006.01)
*G06V 20/59* (2022.01)
(Continued)

(52) U.S. Cl.
CPC ............. *G06V 20/597* (2022.01); *B60Q 9/00* (2013.01); *B60W 60/0051* (2020.02);
(Continued)

(58) Field of Classification Search
USPC .......... 340/439, 441, 444, 435, 525, 539.13, 340/539.22, 576, 667, 665, 670, 691.3
See application file for complete search history.

(56) References Cited

U.S. PATENT DOCUMENTS

| 2002/0099481 | A1* | 7/2002 | Mori | ...................... | G05D 1/027 |
| | | | | | 318/587 |
| 2012/0046802 | A1* | 2/2012 | Inou | .................. | B60W 30/0956 |
| | | | | | 701/1 |

(Continued)

FOREIGN PATENT DOCUMENTS

| JP | 2008-18853 A | 1/2008 |
| JP | 2013-255168 A | 12/2013 |

(Continued)

OTHER PUBLICATIONS

Ono, Y. et al., "Gaze Estimation from Low Resolution Images: Consideration of Appearance Variations due to Identity by Using Kernel-Based Multilinear Models" IEICE J90-D(8):2212-2222 (2007) with English abstract; cited in Specification.

*Primary Examiner* — Daniel Previl
(74) *Attorney, Agent, or Firm* — Troutman Pepper Hamilton Sanders LLP (57) ABSTRACT

A gaze target detector includes a line-of-sight detector, a relative speed data acquiring unit, a relative position data acquiring unit, a curvature calculator, a threshold adjuster, and a gaze determination unit. The line-of-sight detector detects the line of sight of an occupant in a vehicle. The relative speed data acquiring unit acquires a relative speed between the vehicle and a gaze target at which the occupant is gazing. The relative position data acquiring unit acquires a relative position between the vehicle and the gaze target. The curvature calculator calculates the curvature of a traveling track of the vehicle. The threshold adjuster adjusts a threshold based on at least one of the relative speed, the relative position, or the curvature. The threshold is used to determine the gaze target. The gaze determination unit determines the gaze target as a gaze event based on the threshold adjusted.

11 Claims, 8 Drawing Sheets

(51) Int. Cl.
    *G05D 1/00*         (2006.01)
    *B60W 60/00*      (2020.01)
    *B60Q 9/00*        (2006.01)
    *G06V 20/56*      (2022.01)

(52) U.S. Cl.
    CPC ......... *G05D 1/0061* (2013.01); *G06V 20/588* (2022.01); *B60W 2540/225* (2020.02)

(56) References Cited

U.S. PATENT DOCUMENTS

| | | | |
|---|---|---|---|
| 2017/0153797 A1* | 6/2017 | Cox | G06F 3/0485 |
| 2017/0248954 A1* | 8/2017 | Tomatsu | G05D 1/0088 |
| 2018/0082501 A1* | 3/2018 | Kochhar | B60W 40/00 |
| 2018/0118244 A1* | 5/2018 | Salha | B62B 5/0026 |
| 2018/0297594 A1* | 10/2018 | Takahashi | B60W 10/04 |
| 2019/0179406 A1* | 6/2019 | Manda | G06F 3/0484 |
| 2019/0377191 A1* | 12/2019 | Hughes | G02B 27/017 |
| 2020/0110946 A1* | 4/2020 | Kline | G08B 21/182 |

FOREIGN PATENT DOCUMENTS

| | | |
|---|---|---|
| JP | 2017-138762 A | 8/2017 |
| JP | 2019-215805 A | 12/2019 |
| WO | 2017/013739 A1 | 1/2017 |

\* cited by examiner

GAZE EVENT DB

| EVENT ID | DATE | TARGET EVENT (POSITION DATA, IMAGE DATA, ETC.) | GAZING PERSON |
|---|---|---|---|
| 1 | 20** *** *** | **** | ID:001 |
| 2 | 20** *** *** | **** | ID:001 |
| 3 | 20** *** *** | **** | ID:002 |
| 4 | | | |
| 5 | | | |
| 6 | | | |
| 7 | | | |

GAZE EVENT DB₂

| EVENT ID | DATE | TARGET EVENT (POSITION DATA, IMAGE DATA, ETC.) | GAZING PERSON | ATTRIBUTE OF GAZE EVENT |
|---|---|---|---|---|
| 1 | 20.. | ** | ID:001 | BUILDING |
| 2 | 20.. | ** | ID:001 | PERSON |
| 3 | 20.. | ** | ID:002 | OTHER |
| 4 | | | | |
| 5 | | | | |
| 6 | | | | |
| 7 | | | | |

FIG. 8

GAZE EVENT DB₃

| EVENT ID | DEGREE OF INTEREST (HIGH/ MODERATE) | EMOTION VALUE (POSITIVE/ NEGATIVE) | PROCESS HISTORY | STORED IN |
|---|---|---|---|---|
| 1 | HIGH | POSITIVE | STORED | IN-VEHICLE DATABASE |
| 2 | MODERATE | POSITIVE | PRESENTED BY SOUND AND IMAGE | IN-VEHICLE DATABASE |
| 3 | MODERATE | NEGATIVE | PRESENTED BY SOUND | IN-VEHICLE DATABASE |
| | | | | |
| | | | | |
| | | | | |
| | | | | |

FIG. 9

GAZE TARGET DETECTOR

CROSS-REFERENCE TO RELATED APPLICATIONS

The present application claims priority from Japanese Patent Application Nos. 2020-046264 filed on Mar. 17, 2020, and 2020-151199 filed on Sep. 9, 2020, the entire contents of each of which are hereby incorporated by reference.

BACKGROUND

The technology relates to a gaze target detector.

Automobiles are highly convenient means of transportation. People are capable of going to various places in their automobiles. While driving automobiles, occupants in the automobiles often gaze at an external object that draws their interests.

To address such a concern, a method has been proposed that specifies the gaze area of an occupant and automatically captures an image of a target object present in the gaze area. For example, Japanese Unexamined Patent Application Publication (JP-A) No. 2008-018853 discloses a data storage that stores image data of driving scenes that is divided into several pieces of data as appropriate. The method of JP-A No. 2008-018853 is applicable to a situation where no conversation is made. Further, JP-A No. 2013-255168 discloses an imaging device that determines the gaze area of an occupant on the basis of the direction of the line of sight of the occupant detected by a line-of-sight detector, specifies the direction to a target object which the occupant is interested in, and automatically captures an image of the target object.

SUMMARY

An aspect of the technology provides a gaze target detector. The gaze target detector includes a line-of-sight detector, a relative speed data acquiring unit, a relative position data acquiring unit, a curvature calculator, a threshold adjuster, and a gaze determination unit. The line-of-sight detector is configured to detect the line of sight of an occupant in a vehicle. The relative speed data acquiring unit is configured to acquire a relative speed between the vehicle and a gaze target at which the occupant is gazing. The relative position data acquiring unit is configured to acquire a relative position between the vehicle and the gaze target. The curvature calculator is configured to calculate the curvature of a traveling track of the vehicle. The threshold adjuster is configured to adjust a threshold on the basis of at least one of the relative speed, the relative position, or the curvature. The threshold is used to determine the gaze target. The gaze determination unit is configured to determine the gaze target as a gaze event on the basis of the threshold adjusted by the threshold adjuster.

An aspect of the technology provides a gaze target detector for a vehicle. The gaze target detector includes circuitry configured to: detect the line of sight of an occupant in the vehicle; acquire a relative speed between the vehicle and a gaze target at which the occupant is gazing; acquire a relative position between the vehicle and the gaze target; calculate the curvature of a traveling track of the vehicle; adjust a threshold on the basis of at least one of the relative speed, the relative position, or the curvature; and determine the gaze target as a gaze event on the basis of the threshold adjusted. The threshold is used to determine the gaze target.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Currently developed techniques including ones disclosed in JP-A Nos. 2008-018853 and 2013-255168 described above are far from satisfying market needs in an appropriate manner, and have a room for improvement in the following aspects. For example, JP-A No. 2008-018853, which fails to disclose the use of vehicle traveling data including vehicle speed data in gaze behavior detection, finds it difficult to detect a gaze of an occupant in a vehicle traveling on a high-speed way. JP-A No. 2013-255168 discloses the use of data on an own-vehicle speed detected by a speed sensor. However, the data is used only to estimate a relative distance between a target object and the own vehicle. In a case where the own vehicle is turning and the target object is moving, for example, JP-A No. 2013-255168 finds it difficult to properly specify the target object to be presented to the occupant.

It is desirable to provide a gaze target detector for a vehicle that detects a gaze target at which an occupant in the vehicle is gazing in an appropriate manner in accordance with various traveling environments.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. Configurations other than those described below, such as a known vehicle structure or a known imaging system having an interior camera or various vehicle sensors, may also be employed as appropriate. For example, the methods disclosed in JP-A Nos. 2008-018853 and 2013-255168 described above may be used to detect a gaze of an occupant or determine a gaze area of an occupant within the gist of the example embodiment of the technology.

Figure 1:
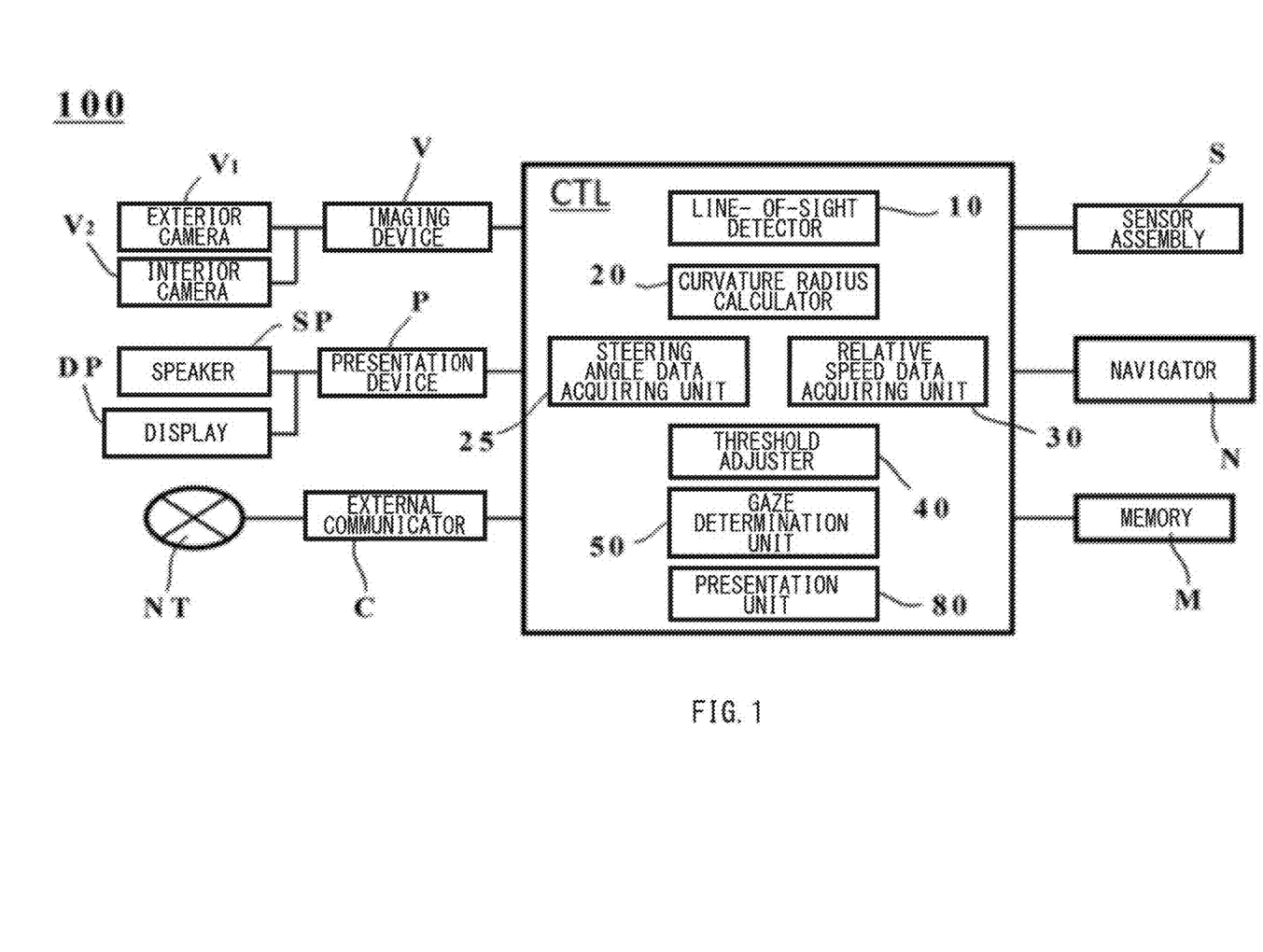
FIG. 1 is a block diagram illustrating a system configuration of a gaze target detector according to a first example embodiment of the technology.

FIG. 1 illustrates an example system configuration of a gaze target detector 100 according to a first example embodiment of the technology. The gaze target detector 100 according to the first example embodiment is configured to detect a gaze target at which an occupant in a vehicle is gazing. The gaze target detector 100 may be mounted in a two-wheel-drive vehicle or a four-wheel-drive vehicle, for example. The gaze target detector 100 may be configured to cause an imaging device V to automatically capture an image of an exterior environment of the vehicle. The term "gaze target" used herein may refer to an object, a person, a building, an advertisement, or an event which the occupant pays attention to. The term "gaze event" used herein may refer to the gaze target (e.g., an object, a person, a building, an advertisement, or an event) which the occupant has gazed at for a time longer than a threshold T.

The gaze target detector 100 may include, for example, a controller CTL, the imaging device V, a presentation device P, an external communicator C, a sensor assembly S, a navigator N, and a memory M. Note that the following description is made assuming that the gaze target detector 100 is mounted in a four-wheel-drive vehicle.

The imaging device V may include an exterior camera $V_1$ and an interior camera $V_2$. The exterior camera $V_1$ may be one or more known on-vehicle cameras that capture an image of an exterior environment of the vehicle. The exterior camera $V_1$ may have a known tilt mechanism or a known pan-tilt mechanism to capture a 360-degree image of the exterior environment of the vehicle, for example. Note that the tilt mechanism may be omitted, and alternatively, the imaging device V may include several wide-angle cameras that capture respective images in front, rear, right, and left directions in an independent manner.

The interior camera $V_2$ may include one or more cameras that capture an image of an occupant. To certainly detect the line of sight of each occupant, the interior camera $V_2$ may include several cameras that capture respective images of occupants seated in a driver's seat, a passenger's seat, a right rear seat, and a left rear seat. The exterior camera $V_2$ may be a known on-vehicle camera that captures a facial image of each occupant using visual light or infrared light.

The presentation device P according to the first example embodiment may include a known on-vehicle speaker SP and a known on-vehicle display DP. The display DP may also serve as a monitor of the navigator N described later. Further, the presentation device P according to the first example embodiment may be configured to communicate with a mobile terminal such as a smartphone carried by the occupant via a known wireless communication such as a near-field communication. This allows the presentation device P to present the gaze event to the occupant via the smartphone.

The external communicator C may be a known communicator that establishes various information communications with external devices via a packet communication network for the smartphone, or a next-generation wireless communication system for automobiles, such as a known information communication service for connected cars. This allows the external communicator C to transmit data on the gaze event described later to the outside of the vehicle via a network NT, such as the Internet.

The sensor assembly S may include a known speed sensor that detects a vehicle speed, a known acceleration sensor that detects an acceleration rate, or a known steering angle sensor that detects a steering angle of the steering wheel. In the first example embodiment, the steering angle sensor that acquires data on a steering angle may correspond to a steering angle data acquiring unit 25 described later. Additionally, in the first example embodiment, the speed sensor that detects an own vehicle speed may correspond to a relative speed data acquiring unit 30 described later.

The navigator N may include a known positioning system, such as the global positioning system (GPS), that acquires position data of the vehicle, and map data regarding region names and buildings. The attribute of the gaze event described later may be determined on the basis of genres (e.g., popular sites, leisure facilities, restaurants, and convenience stores) included in the map data, for example. In the first example embodiment, the map data may be stored in the navigator N; however, this is a non-limiting example. Alternatively, the map data may be downloaded by the controller CTL described in detail later from a cloud storage via a known communication network such as the Internet on the basis of the GPS data of the own vehicle. In such a case, the navigator N may refer to the map data downloaded from the cloud storage, for example.

The navigator N may operate in cooperation with the controller CTL described in detail later. In one embodiment, the navigator N may serve as a "relative position data acquiring unit". The relative position data acquiring unit acquires a relative position between the vehicle and the gaze target. For example, the controller CTL may acquire the relative position between the vehicle and the gaze target on the basis of the position data of the own vehicle received from the navigator N and the position data of the gaze target specified and calculated by the line-of-sight detector 10. Note that the method of calculating the relative position between the vehicle and the gaze target should not be limited to the example described above. Alternatively, a known method of detecting a relative position, such as one disclosed in WO 2017/013739 may be used, for example. The memory M may be a known means that temporary stores the gaze event as needed. For example, the memory M may be a hard disc drive or a non-volatile memory.

Next, the controller CTL of the gaze target detector 100 is described in detail. With reference to FIG. 1, the controller CTL according to the first example embodiment includes the line-of-sight detector 10, a curvature calculator 20, the relative speed data acquiring unit 30, a threshold adjuster 40, and a gaze determination unit 50. The controller CTL may further include a steering angle data acquiring unit 25 and a presentation unit 80.

The line-of-sight detector 10 may extract the direction of the line of sight of each occupant from a facial image of each occupant captured by the interior camera $V_2$ described above. The line of sight of each occupant may be detected by a known gaze tracking method. Reference is made to Yasuhiro Ono, Takahiro Okabe, and Yoichi Sato (2007) "Gaze Estimation from Low Resolution Images", the IEICE transactions on information and systems, vol. J90-D, No. 8, pp. 2212-2222, as disclosed in JP-A No. 2013-255168. Alternatively, a known gaze detection method may be used that extracts facial feature points.

The curvature calculator 20 may calculate a curvature ρ (i.e., an inverse of a curvature radius R) of a traveling track of the own vehicle. For example, the curvature calculator 20 according to the first example embodiment may calculate the curvature ρ of the traveling track of the own vehicle by a calculation method disclosed in JP-A No. 2011-008385 or another known curvature calculation method. It is difficult for the controller CTL to specify a turning direction of the own vehicle only on the basis of the curvature ρ of the traveling track of the own vehicle acquired by the curvature calculator 20. Thus, the controller CTL may specify the turning direction of the own vehicle by combining the curvature ρ of the traveling track of the own vehicle and another pieces of data, such as steering angle data SI, lateral acceleration data, yaw angle data, or map data described later.

The steering angle data acquiring unit 25 may acquire the steering angle data SI on a steering angle of the own vehicle via the known steering angle sensor described above. For example, the steering angle data SI acquired by the steering angle data acquiring unit 25 according to the first example embodiment via the steering angle sensor described above may take a positive value when the steering wheel is turned right, and take a negative value when the steering wheel is turned left, with respect to a reference angle of 0° (zero) at traveling straight. Accordingly, in a case where the steering angle data SI acquired by the steering angle data acquiring unit 25 takes a positive value, it may be determined that the own vehicle is turning right. In contrast, in a case where the steering angle data SI acquired by the steering angle data acquiring unit 25 takes a negative value, it may be determined that the own vehicle is turning left. In this way, whether the own vehicle is turning may be determined on the basis of the steering angle data SI in the first example embodiment; however, this is a non-limiting example. Alternatively, whether the own vehicle is turning may be determined on the basis of the lateral acceleration data or the yaw angle data of the own vehicle, as described above.

The relative speed data acquiring unit 30 may acquire relative speed data VI by detecting a relative speed between the own vehicle and the gaze target using the exterior camera $V_1$, for example. Note that the method of detecting the relative speed between the own vehicle and the gaze target should not be limited to a known analysis using a camera. Alternatively, a method of calculating a relative speed between the own vehicle and another vehicle traveling on another lane, as disclosed in JP-A No. 2019-215805, or a relative speed detection method using a millimeter-wave radar may be used, for example. In a case where the gaze target is a vehicle (hereinafter referred to as a gaze target vehicle), for example, the gaze target vehicle may be always connected to the network NT (e.g., the Internet) via a connection technology. In such a case, the own vehicle and the gaze target vehicle may detect a vehicle speed and an advancing direction of the vehicles in a bidirectional manner. Thus, the relative speed data VI may be calculated on the basis of the vehicle speed and the advancing direction of the counterpart vehicle acquired via the connection technology. This allows the relative speed data acquiring unit 30 to acquire a relative speed vector of the gaze target vehicle relative to the own vehicle (i.e., the advancing direction and the speed of the gaze target vehicle relative to the own vehicle).

The relative speed data acquiring unit 30 may acquire relative position data PI on the position of the gaze target relative to the own vehicle. For example, the relative speed data acquiring unit 30 may acquire angle data θ on an angle between the own vehicle and the gaze target and distance data d on a distance between the own vehicle and the gaze target on the basis of the image data received from the exterior camera $V_1$ or a known range sensor (not illustrated), for example. Herein, the angle data θ may refer to an angle(° defined between a reference line (0°) extending in the advancing direction of the own vehicle and a straight line connecting the own vehicle and the gaze target. For example, in a case where the gaze target is residing in front of the own vehicle on the left, the angle data θ may take a negative angle (between −90° and 0). In a case where the gaze target is residing in front of the own vehicle on the right, the angle θ may take a positive angle (between 90° and 180°).

The threshold adjuster 40 may adjust the threshold T used to determine the gaze target on the basis of at least one of the relative speed data VI, the relative position data PI, the steering angle data SI, or the curvature ρ of the traveling track of the own vehicle. For example, the threshold adjuster 40 may adjust the threshold T on the basis of a given combination of some or all of the relative speed data VI, the relative position data PI, the steering angle data SI, and the curvature ρ. Examples of the combination may include a combination of the relative speed data VI and the curvature ρ, a combination of the relative speed data VI, the steering angle data SI, and the curvature ρ, and a combination of relative speed data VI, the relative position data PI, the steering angle data SI, and the curvature ρ. As described above, the steering angle data SI in these combinations may be replaced with the lateral acceleration data or the yaw angle data.

Reasons why the threshold T needs to be adjusted will now be described in detail. In a case where the occupant is gazing at a gaze target outside the vehicle, the degree of leeway to gaze at the gaze target may greatly change in accordance with a traveling state of the vehicle. For example, a time allowed for the occupant to gaze at a gaze target residing on a high-speed way while the vehicle is moving at a high speed may be shorter than a time allowed for the occupant to gaze at a gaze target residing on an ordinary road. Additionally, a time allowed for the occupant to gaze at a gaze target residing on the right side of the vehicle may be longer than a time allowed for the occupant to gaze at a gaze target residing on the left side of the vehicle while the vehicle is turning right (taking a curve to the right).

The time allowed for the occupant to gaze at the gaze target may greatly differ depending on a direction in which the gaze target is moving. Accordingly, the time allowed for the occupant to gaze at the gaze target may change in accordance with the traveling state of the own vehicle (e.g., whether the own vehicle is turning or whether the own vehicle is traveling on a high-speed way) and a change in positional relation between the own vehicle and the target object. During the travel of the vehicle, the occupant gazes at various target objects. Thus, it is impractical to store or present data on all target objects which the occupant has gazed at, and it is needed to determine whether the occupant is gazing at the gaze target with interest using a threshold. According to the first example embodiment, the threshold T variable in accordance with the traveling state of the own vehicle and the relative speed may be set, rather than a constant threshold. With such a variable threshold T, the gaze target which the occupant is gazing at with interest is appropriately determined as a gaze event.

[Variable Threshold T]

In the first example embodiment, the controller CTL may calculate the threshold T by the following expression:

$$T = \gamma \times SV$$

where "$\gamma$" denotes a coefficient or a parameter variable within the range from 0 (exclusive) to 1 (inclusive) (i.e., $0 < \gamma \leq 1$), and "SV" denotes a given reference gaze determination time (e.g., several seconds). The coefficient $\gamma$ may be determined on the basis of at least one of the relative speed data, the relative position data, the steering angle data, or the curvature of the traveling track of the own vehicle.

In one example, the coefficient $\gamma$ may be calculated by the following expression:

$$\gamma = \frac{1+\sin\theta}{2} \times \frac{1+\sin\theta_V}{2} \times \qquad \text{Expression 1}$$
$$\frac{V_{th} - |V|}{V_{th}} \times \frac{R}{R_{max}} \times \frac{1+\cos\theta}{2} (SI > 0)$$
$$\gamma = \frac{1+\sin\theta}{2} \times \frac{1+\sin\theta_V}{2} \times \frac{V_{th} - |V|}{V_{th}} \times$$
$$\frac{R}{R_{max}} \times \frac{1-\cos\theta}{2} (SI < 0)$$

where "$\theta$" denotes the angle data $\theta$, "$\theta v$" denotes the direction of the relative speed vector, "$|V|$" denotes the relative speed, "R" denotes the curvature radius R, "SI" denotes the steering angle data SI, "$V_{th}$" denotes a reference speed corresponding to a maximum relative speed on an ordinary road, and "$R_{max}$" denotes a given threshold of the curvature radius. Note that the threshold $R_{max}$ is equal to the curvature radius R (i.e., "$R_{max}=R$" is satisfied) when the curvature radius R is greater than $R_{max}$ (i.e., "$R>R_{max}$" is satisfied).

In place of Expression 1 described above, the coefficient $\gamma$ may be calculated by, for example, adding independent terms, as in the following expression:

$$\gamma = \frac{1}{S}\left(\frac{1+\sin\theta}{2} + \frac{1+\sin\theta_V}{2} + \frac{V_{th} - |V|}{V_{th}} + \frac{R}{R_{max}} + \frac{1+\cos\theta}{2}\right) \quad \text{Expression 2}$$
$$(SI > 0)$$
$$\gamma = \frac{1}{S}\left(\frac{1+\sin\theta}{2} + \frac{1+\sin\theta_V}{2} + \frac{V_{th} - |V|}{V_{th}} + \frac{R}{R_{max}} + \frac{1-\cos\theta}{2}\right)$$
$$(SI < 0)$$

where "$V_{th}$" denotes the reference speed corresponding to the maximum relative speed on an ordinary road, and "$R_{max}$" denotes a given threshold of the curvature radius. Note that the threshold $R_{max}$ is equal to the curvature radius R (i.e., "$R_{max}=R$" is satisfied) when the curvature radius R is greater than $R_{max}$ (i.e., "$R>R_{max}$" is satisfied). On the basis of Expression 2 using such addition, it is possible to calculate the coefficient $\gamma$ on the basis of other terms even if the curvature radius R is not acquired for some reason.

In Expression 2 using such addition, some of the terms may be multiplied by a weighting coefficient. For example, the term of the relative speed and the term of the curvature radius may be twice as much as each of the other terms. A specific value of the weighting coefficient may be determined by an experiment or a simulation, for example.

As apparent from Expressions 1 and 2 described above, the controller CTL according to the first example embodiment may set a smaller coefficient $\gamma$ as the value of the relative speed included in the relative speed data VI increases, for example. Alternatively, the controller CTL may set a smaller coefficient $\gamma$ as the direction of the speed vector $\theta v$ of the gaze target relative to the own vehicle increases (i.e., as the direction of the speed vector $\theta v$ of the gaze target becomes opposite to the advancing direction of the own vehicle).

Still alternatively, the controller CTL may set a smaller coefficient $\gamma$ as the curvature $\rho$ of the traveling track of the own vehicle increases (i.e., as the curvature radius R decreases). Yet alternatively, the controller CTL may set a smaller coefficient $\gamma$ as the angle data $\theta$ in the relative position data PI increases (i.e., as the gaze target is residing opposite to the advancing direction of the own vehicle). Still alternatively, the controller CTL may set the coefficient $\gamma$ on the basis of a term other than those in the expressions described above. For example, the controller CTL may set a smaller coefficient $\gamma$ as the distance data d in the relative position data PI decreases (i.e., as the gaze target is residing closer to the own vehicle).

Alternatively, the controller CTL may calculate the coefficient $\gamma$ by combining various pieces of data, as described above. For example, the controller CTL may calculate the coefficient $\gamma$ by combining the angle data $\theta$ and the steering angle data SI so that the coefficient $\gamma$ applied to a gaze target residing on the left side with respect to the advancing direction of the own vehicle is smaller than the coefficient $\gamma$ applied to a gaze target residing on the right direction with respect to the advancing direction of the own vehicle in a case where the own vehicle is turning right. In other words, when the own vehicle is turning right (i.e., "SI>0" is satisfied), the coefficient $\gamma$ applied to a gaze target residing on the left side (i.e., satisfying "$\theta<0$") may be smaller than the coefficient $\gamma$ applied to a gaze target residing on the right side (i.e., satisfying "$\theta>0$"). In contrast, when the own vehicle is turning left (i.e., "SI<0" is satisfied), the coefficient $\gamma$ applied to the gaze target residing on the right side (i.e., satisfying "$\theta>0$") may be smaller than the coefficient $\gamma$ applied to the gaze target residing on the left side (i.e., satisfying "$\theta<0$").

The gaze determination unit 50 may determine the gaze target as the gaze event on the basis of the threshold T adjusted by the threshold adjuster 40. For example, on the basis of the threshold T set to "SV" by the threshold adjuster 40, the gaze determination unit 50 may determine that the gaze target as the gaze event when the gazing time of the occupant becomes equal to SV seconds. This allows a gaze target at which the occupant is gazing with interest to be determined as the gaze event in a more appropriate manner even in an environment where it is difficult for the occupant to gaze at the gaze target.

Accordingly, the threshold T used to determine the gaze target as the gaze event may be smaller in a case where the own vehicle is turning at a high speed relative to the gaze target than in a case where the own vehicle is traveling straight, for example. This reduces the likelihood of failing to detect a gaze target at which the occupant is gazing while the vehicle is turning at a high speed.

The presentation unit 80 may present the gaze event to the occupant via the presentation device P. For example, the presentation unit 80 according to the first example embodiment may present the gaze event determined by the gaze determination unit 50 via at least one of the speaker SP or the display DP. In other words, the presentation unit 80 may select the way to present the gaze event from presenting the gaze event using both a sound and an image, presenting the gaze event using either one of a sound and an image, and storing the gaze event in the memory M rather than presenting the gaze event using a sound and/or an image. Alternatively, the presentation unit 80 may store the gaze event in the memory M while presenting the gaze event to the occupant.

In such a case, the presentation unit 80 may present the gaze event to not only the occupant gazing at the gaze event but also another occupant in the vehicle. Additionally or alternatively, the presentation unit 80 may cause a mobile terminal such as a smartphone carried by the occupant to present the gaze event via a known wireless communication such as a near-field wireless communication.

In some examples, the presentation unit 80 may store the gaze event determined by the gaze determination unit 50 as determined gaze target data in the memory M. This allows ex-post confirmation of the gaze event which the occupant has gazed at with interest using a sound or image, or sharing the gaze event with other persons. An example way to store the determined gaze target data including the gaze event in the memory M will now be described with reference to FIG. 3.

Figure 3:
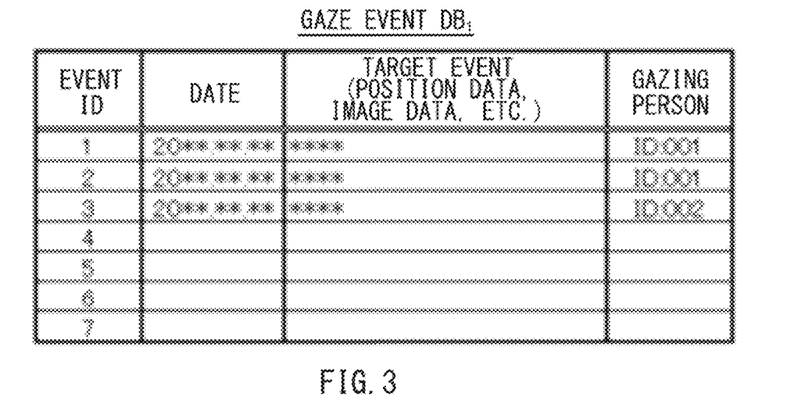
FIG. 3 is a table illustrating an example configuration of a database that stores determined gaze target data including gaze events determined by the gaze target detector according to the first example embodiment of the technology.

FIG. 3 illustrates an example of the determined gaze target data including the gaze events determined by the gaze determination unit 50 and stored in the form of a database in the memory M. As illustrated in FIG. 3, each piece of the determined gaze target data may include an individual identification number, the date of an occurrence, target event data (i.e., the content of the gaze event), and data on a person gazing at the gaze event.

Note that the configuration of the database illustrated in FIG. 3 is a non-limiting example, and time data or another optional data may be added. The data on the person gazing at the gaze event may be assigned with an identification number after the face recognition using the interior camera V$_2$ described above. This enables automatic assignment of the identification number to the data on the person (i.e., occupant in the vehicle) gazing at the gaze target.

The gaze events of the occupants may be grouped in accordance with the identification number assigned to the data on each person (i.e., occupant) gazing at the gaze target before being stored in the memory M. This allows the presentation unit 80 to present the gaze events grouped for each occupant, enabling a wider range of ways to present the gaze events. For example, a gaze event of the driver may be presented preferentially over gaze events of other persons.

[Method of Detecting Gaze Target]

Next, a method of detecting the gaze target according to the first example embodiment of the technology will now be described with reference to FIG. 2. Note that steps of the gaze target detection method described in detail below may be performed by the controller CTL. The controller CTL according to the first example embodiment may detect the line of sight of the occupant in the vehicle (i.e., the own vehicle) as described above to recognize the gaze target of the occupant. Thereafter, the controller CTL may determine whether the gaze target at which the occupant is gazing is to be determined as the gaze event on the basis of the threshold T described above.

First, in STEP 1, the controller CTL may cause the line-of-sight detector 10 to detect the line of sight of the occupant. For example, the line-of-sight detector 10 of the controller CTL may recognize the line of sight of the occupant using the interior camera V$_2$ as described above. In a case where a plurality of occupants is present in the vehicle, the line-of-sight detector 10 of the controller CTL may detect the line of sight for each occupant in STEP 1. Note that the following description is made assuming that the line of sight of the driver is detected.

In STEP 2, the controller CTL may determine whether the occupant is gazing at a gaze target. For example, the controller CTL may specify the gaze target in a way similar to the method disclosed in JP-A No. 2013-255168. In such a case, the controller CTL may reduce the number of potential gaze targets of the occupant referring to the map data of the navigator N and the position data of the vehicle. If determining that there is no gaze target on the basis of the line of sight discretely moving beyond a predetermined range (STEP 2: NO), the controller CTL may return the process to STEP 1 to repeat the detection of the line of sight.

If determining that the occupant is gazing at a gaze target (STEP 2: YES), the controller CTL may determine whether the gaze target is a new target in STEP 3. For example, if determining that there is no past gaze target at an initial stage of the process (STEP 3: YES), the controller CTL may cause the process to proceed to STEP 4-B. In contrast, if determining that the gazing time has not reached the threshold T (STEP 5: NO) and returning the process to STEP 1 to repeat the steps, the controller CTL may determine that the gaze target remains unchanged (STEP 3: NO), and cause the process to proceed to STEP 4-A.

In STEP 4-A, the threshold T (described below) may be determined or calculated that is used to determine whether the gaze target is to be determined as the gaze event. For example, the threshold adjuster 40 of the controller CTL may acquire at least one of the curvature ρ of the traveling track of the own vehicle, the relative speed data VI, or the relative position data PI respectively from the curvature calculator 20, the steering angle data acquiring unit 25, and the relative speed data acquiring unit 30 to calculate the coefficient γ. On the basis of the coefficient γ calculated on the basis of the data acquired, the threshold adjuster 40 of the controller CTL may determine or adjust the threshold T for determining the gaze target.

Figure 2:
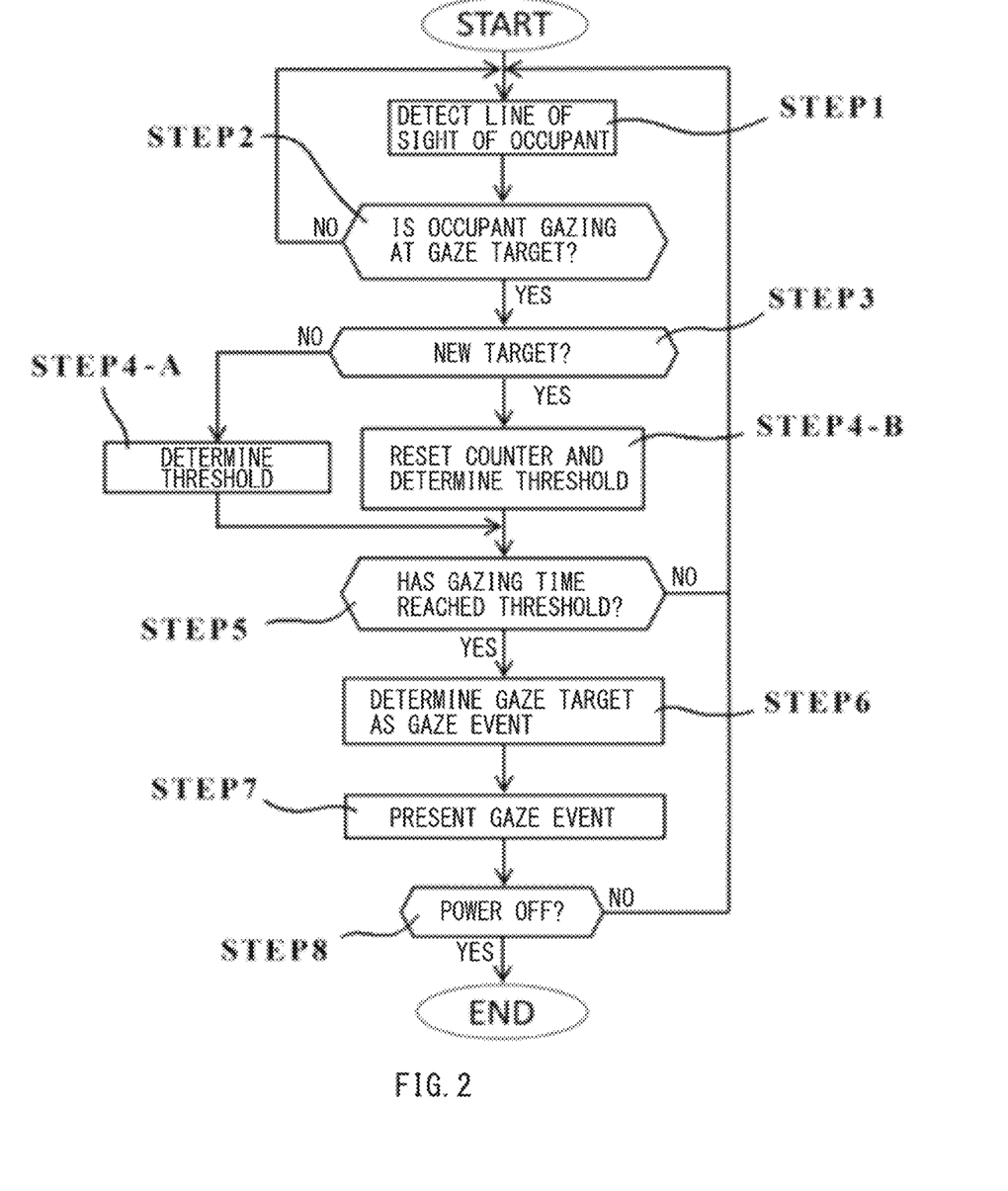
FIG. 2 is a flowchart illustrating a method of detecting a gaze target according to the first example embodiment of the technology.

As apparent from FIG. 2, the threshold adjuster 40 according to the first example embodiment may perform the process of determining (recalculating) the threshold T in STEP 4-A even in a case where the gaze target is not a new gaze target (STEP 3: NO). Similarly, in a case where the gaze target is a new gaze target (STEP 3: YES), the threshold adjuster 40 may reset a non-illustrated timer that counts a time when the occupant is gazing at the gaze target (hereinafter referred to as gazing time of the occupant) in STEP 4-B, and perform the process of determining (calculating) the threshold T described above.

In STEP 5 subsequent to STEP 4-A or 4-B, the gaze determination unit 50 of the controller CTL may determine whether the gazing time of the occupant counted by the timer has reached the threshold T adjusted by the threshold adjuster 40. If the gazing time of the occupant has reached the threshold T (STEP 5: YES), the gaze determination unit 50 of the controller CTL may determine that the gaze target is the gaze event at which the occupant is gazing with interest. In contrast, if the gazing time of the occupant has not reached the threshold T (STEP 5: NO), the process may return to STEP 1 to repeat the steps described above. In a case where the gaze target of the occupant remains unchanged, the process may proceed from STEP 1 through STEP 3 and STEP 4-A (not through STEP 4-B) to STEP 5 in which the gaze determination unit 50 of the controller CTL determines whether the gazing time of the occupant counted by the timer has reached the threshold T.

If the gaze target is determined as the gaze target in STEP 6, the gaze event may be presented to the occupant in STEP 7. For example, the presentation unit 80 of the controller CTL may present the gaze event to the occupant via the presentation device P using a sound or an image.

Thereafter, in STEP 8, it may be determined whether a power switch of the vehicle has been turned off after the arrival of the vehicle at the destination, for example. If the power switch has not been turned off yet (STEP 8: NO), the process may return to STEP 1 to repeat the steps described above. If the power switch has been turned off (STEP 8: YES), the process may end.

Accordingly, it may be determined whether the gaze target is to be determined as the gaze event while the vehicle is driven, and the gaze event may be presented to each of the occupants, for example. In the first example embodiment, the presentation unit 80 may present the gaze event to the occupant via the presentation device P. In such a case, the gaze event may be presented instantaneously. Alternatively, the gaze event may be temporarily stored in the memory M and presented afterwards, e.g., after the vehicle is stopped. Still alternatively, the data on the gaze event may be transferred to be presented on a smartphone of the occupant at a given time. According to the gaze target detector and the method of detecting the gaze target of the first example embodiment, it is possible to detect the gaze target at which the occupant is gazing in an appropriate manner in accordance with various traveling environment.

A gaze target detector 110 according to a second example embodiment of the technology will now be described with reference to FIGS. 4 and 5. The second example embodiment is characterized in that data on a seating position of the occupant in the vehicle may also be used to determine the threshold T. Hereinafter, the descriptions of the same components as those in the first example embodiment described above are omitted by assigning the same reference numbers as those in the first example embodiment.

Figure 4:
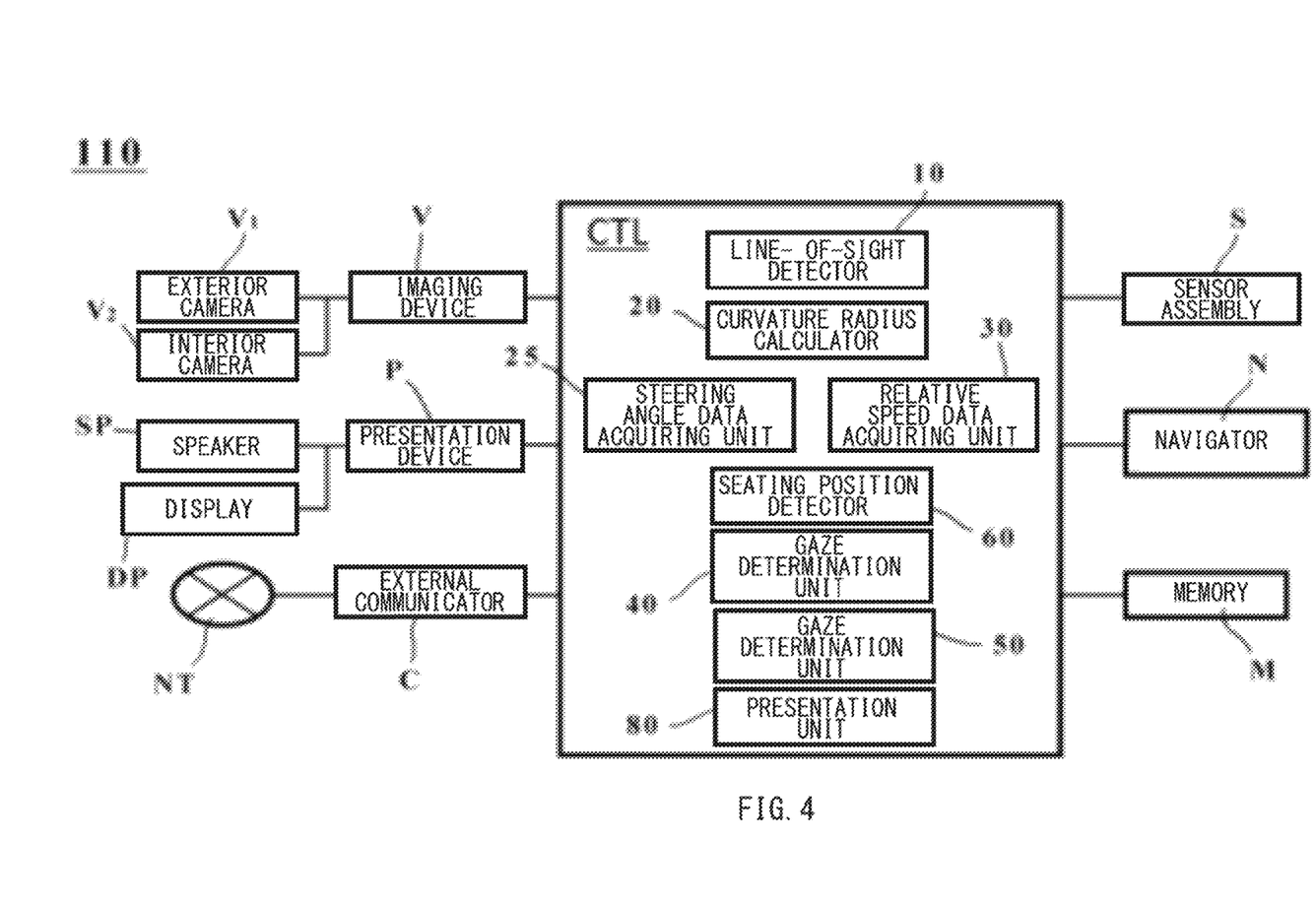
FIG. 4 is a block diagram illustrating an example system configuration of a gaze target detector according to a second example embodiment of the technology.
Figure 5:
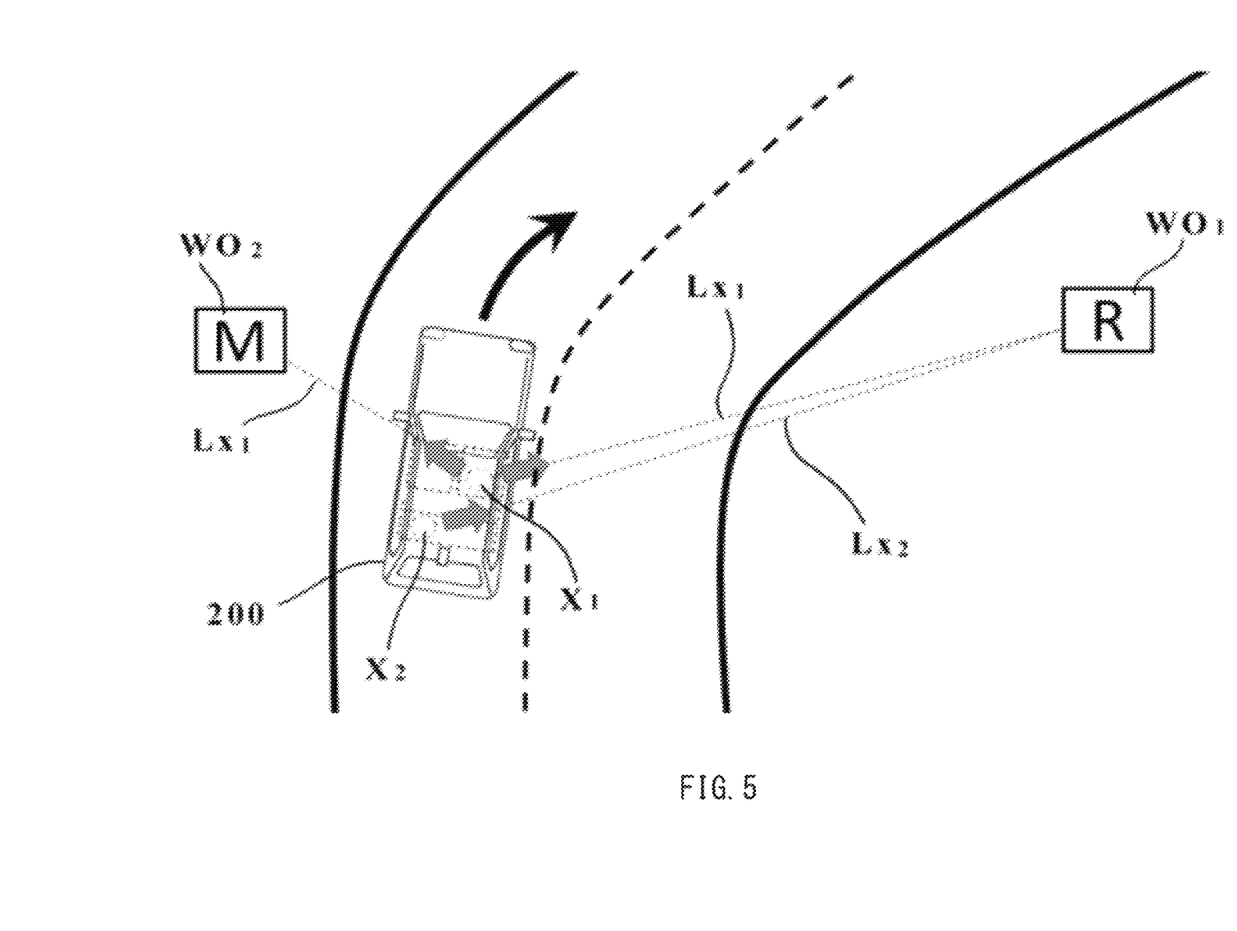
FIG. 5 is a diagram illustrating a way to determine a threshold used in a method of detecting a gaze target according to the second example embodiment of the technology.

With reference to FIG. 4, the gaze target detector 110 according to the second example embodiment may include a seating position detector 60. The seating position detector 60 may acquire seating data indicating that the occupant is seated from a known load sensor (not illustrated) provided in a corresponding seat of the vehicle. The load sensor may be provided in each seat of the vehicle. Note that the seating position of the occupant may be detected on the basis of the data received from the interior camera $V_2$, for example.

The threshold adjuster 40 of the controller CTL may adjust the threshold T in accordance with the seating position of the occupant detected by the seating position detector 60. For example, as illustrated in FIG. 5, the threshold T adjusted by the controller CTL may differ between an occupant $X_1$ seated in a front seat and watching a gaze target (e.g., a restaurant $WO_1$) and an occupant $X_2$ seated in a rear seat and watching the restaurant $WO_1$. For example, a time allowed for the occupant $X_2$ to watch the restaurant $WO_1$ may be shorter than a time allowed for the occupant $X_1$ to watch the restaurant $WO_1$ because of a larger number of blind spots.

In such a case, the threshold adjuster 40 of the controller CTL may control the value of the coefficient γ so that the threshold T applied to the occupant $X_2$ seated in the rear seat is smaller than the threshold T applied to the occupant $X_1$ seated in the front seat, for example. In this way, the controller CTL may adjust or control the threshold T so that the threshold T applied to the occupant seated in the rear seat with a larger number of blind spots is smaller than the threshold T applied to the occupant seated in the front seat.

Further, the occupant $X_1$ seated in a right seat and the occupant $X_2$ seated in a left seat may gaze at the gaze target (e.g., the restaurant $WO_1$) in different conditions. In such a case, the threshold T adjusted by the threshold adjuster 40 of the controller CTL may differ between the occupant $X_1$ seated in the right seat and the occupant $X_2$ seated in the left seat. In this way, the controller CTL may detect the gaze target of the occupant in a more appropriate manner in accordance with the seating position of the occupant, as well as achieving the effect described in the first example embodiment.

To detect the gaze target of the occupant while the vehicle is turning, the threshold adjuster 40 of the controller CTL may adjust the threshold T in accordance with the position of the gaze target with respect to the advancing direction of the vehicle. For example, in a case where the occupant $X_1$ is gazing at two gaze targets (e.g., the restaurant $WO_1$ and a monument $WO_2$) while the vehicle is turning to the right as illustrated in FIG. 5, the threshold T adjusted by the threshold adjuster 40 of the controller CTL may differ between one of the gaze targets residing on the right with respect to the advancing direction of the vehicle (i.e., the restaurant $WO_1$) and the other gaze target residing on the left with respect to the advancing direction of the vehicle (i.e., the monument $WO_2$). The threshold T for the restaurant $WO_1$ may be greater than the threshold T for the monument $WO_2$.

A gaze target detector 120 according to a third example embodiment of the technology will now be described with reference to FIGS. 6 to 9. The third example embodiment is characterized by the following features: (a) the degree of interest of the occupant in the gaze event may be determined; (b) the attribute of the content of the gaze event may be acquired; and (c) the drive control of the vehicle may differ depending on the degree of the interest in the gaze event or the attribute of the content of the gaze event.

Figure 6:
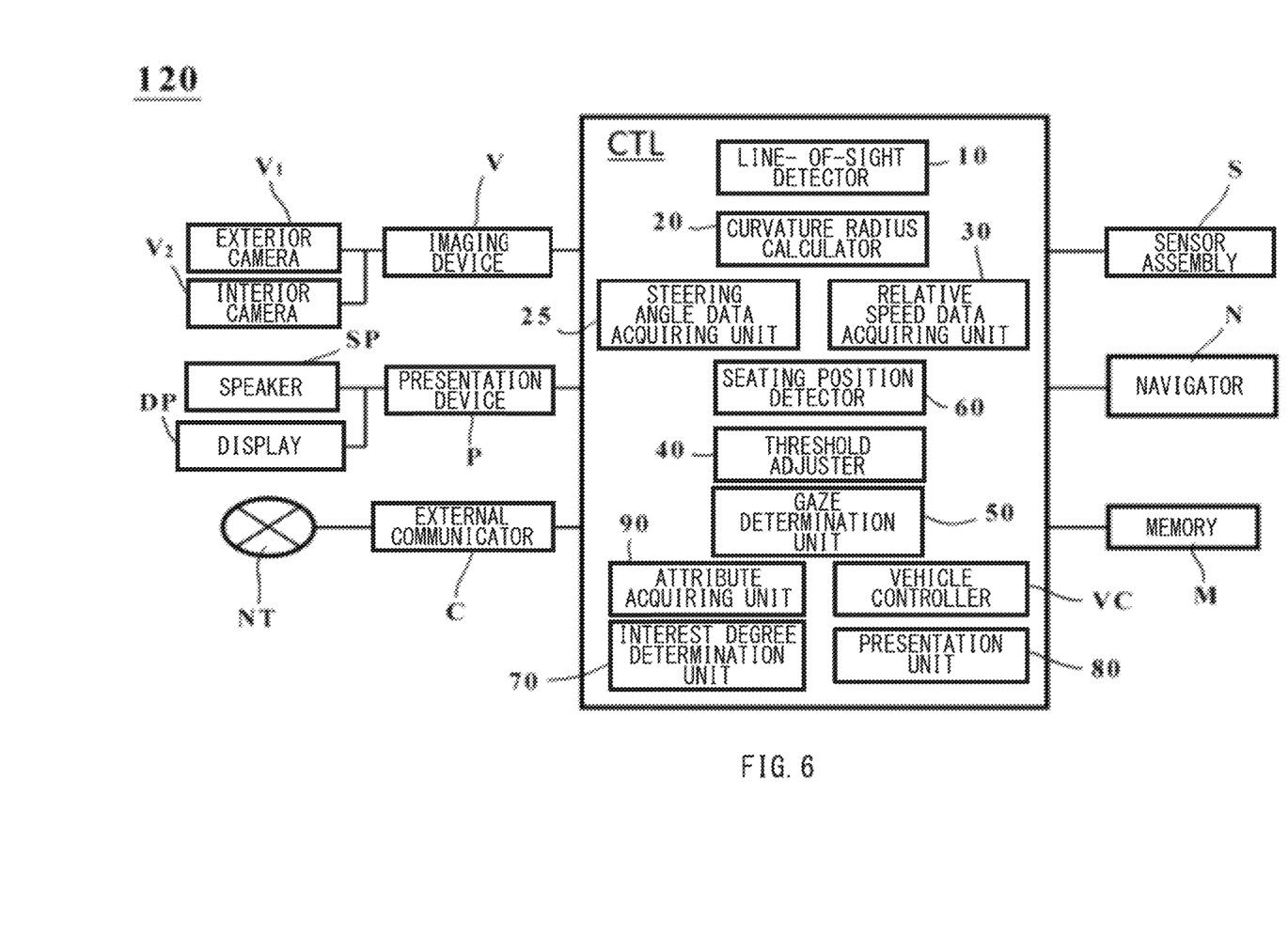
FIG. 6 is a block diagram illustrating an example system configuration of a gaze target detector according to a third example embodiment of the technology.

For example, the gaze target detector 120 according to the third example embodiment may differ from the gaze target detector 100 according to the first example embodiment and the gaze target detector 110 according to the second example embodiment in having an interest degree determination unit 70, an attribute acquiring unit 90, and a vehicle controller VC. In the third example embodiment, all of the features (a) to (c) may be achieved, or a combination of the features (a) and (c) or a combination of the features (b) and (c) may be achieved. Hereinafter, the descriptions of the same components as those in the first and second example embodiments described above are omitted by assigning the same reference numbers as those in the first and second example embodiments.

Figure 7:
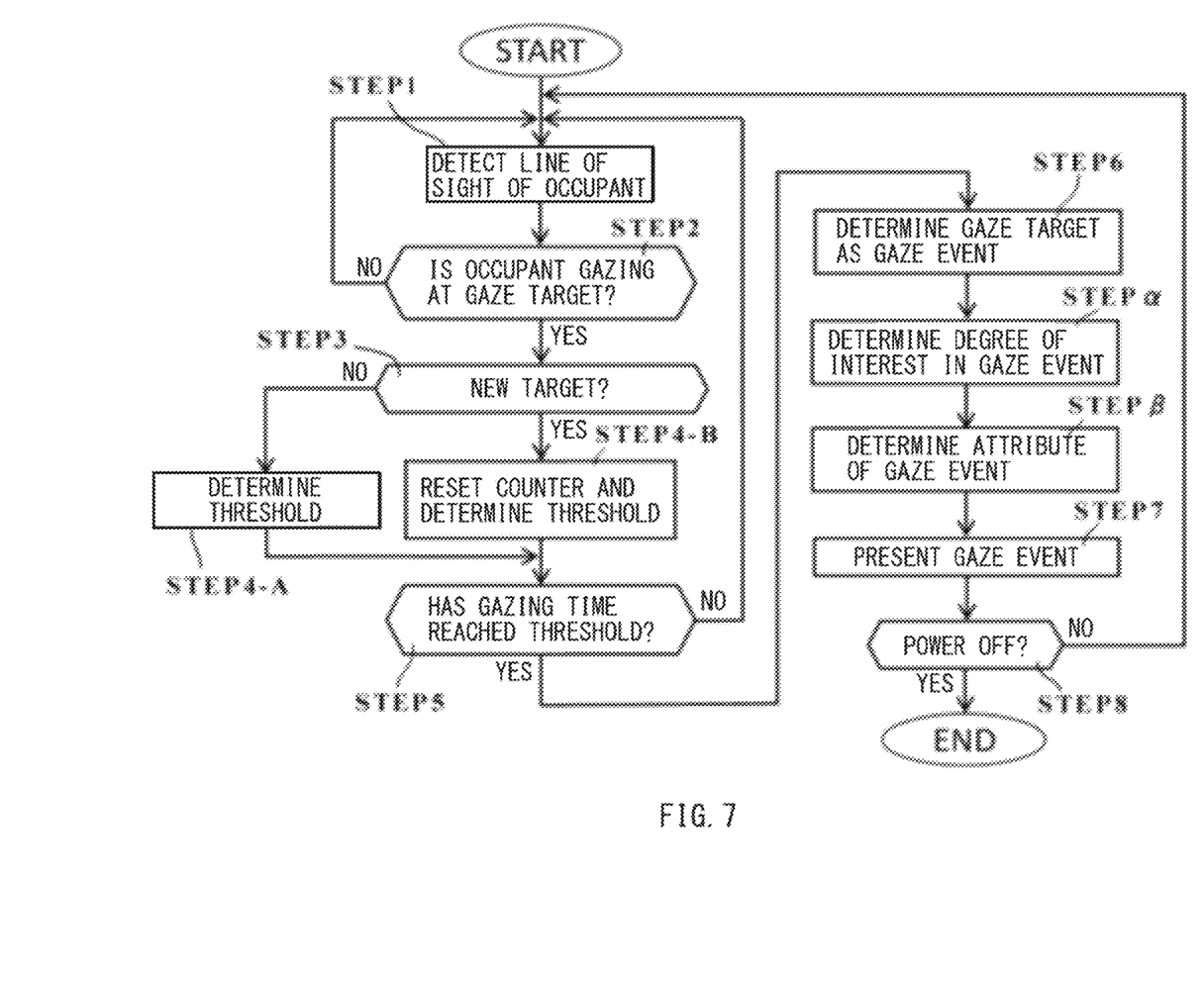
FIG. 7 is a flowchart illustrating a method of detecting a gaze target according to the third example embodiment of the technology.
Figure 8:
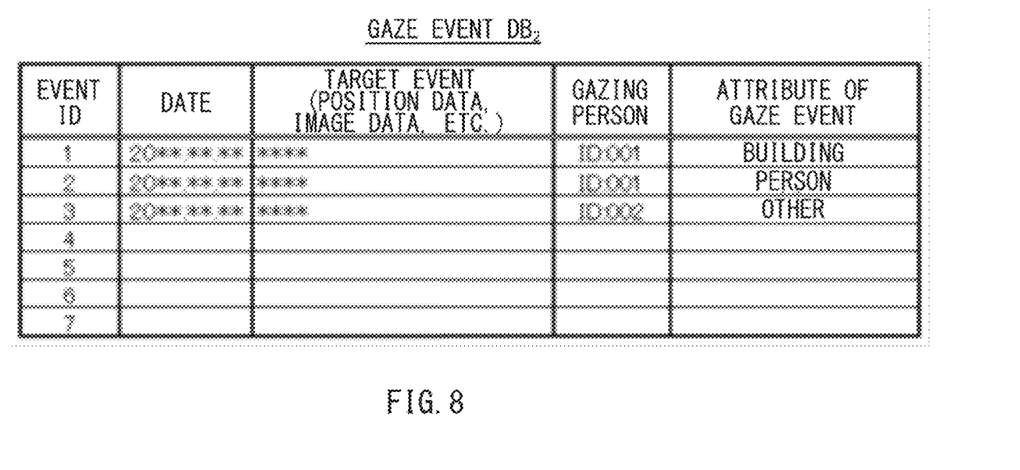
FIG. 8 is a table illustrating an example configuration of a database that stores determined gaze target data including gaze events determined by the gaze target detector according to the third example embodiment of the technology.

A method of detecting the gaze target according to the third example embedment illustrated in FIG. 7 may differ from the method according to the first example embodiment in that STEP α and STEP β are added. In STEP α, the controller CTL may determine the degree of interest in the gaze event determined in STEP 6. For example, the degree of interest of the occupant in the gaze event may be determined by the interest degree determination unit 70 of the controller CTL.

Various known emotion estimation technologies may be employed to detect the degree of interest of the occupant. One example of the emotion estimation technologies may be a method disclosed in JP-A No. 2017-138762, which involves detecting a facial expression of the occupant using the interior camera $V_2$ and estimating an emotion of the occupant through an emotion estimation algorithm using a known artificial intelligence (AI) technology. Another example of the emotion estimation technologies may be a method that involves detecting the emotional ups and downs of the occupant (the driver in this example) by a non-illustrated pulse sensor mounted in the steering wheel to determine an increase or decrease in the degree of interest.

Figure 9:
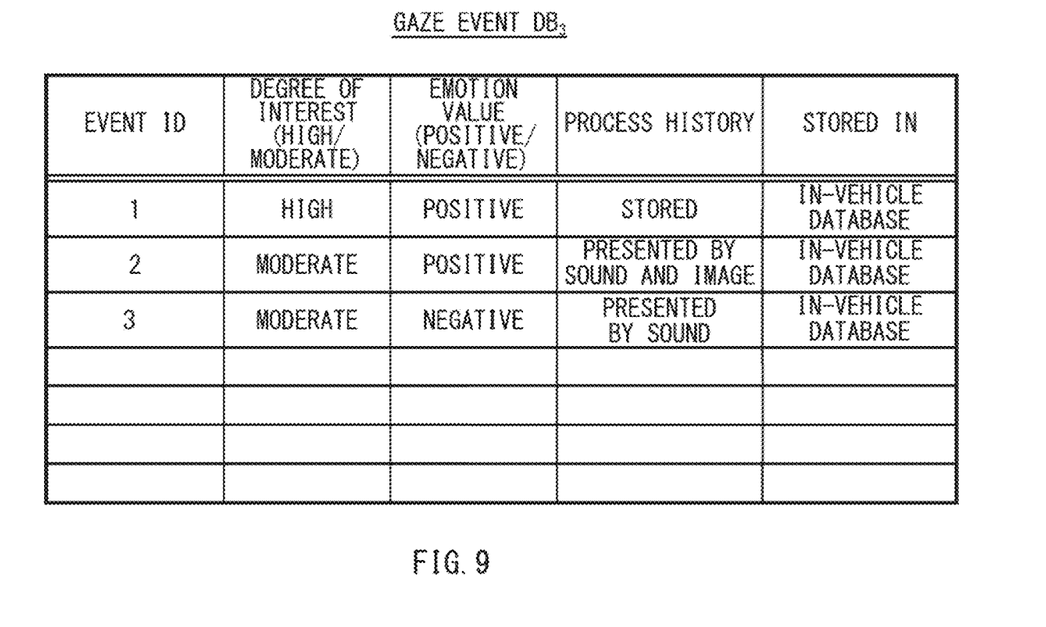
FIG. 9 is a table illustrating another example configuration of the data base that stores the determined gaze target data including the gaze events determined by the gaze target detector according to the third example embodiment of the technology.

Thereafter, in STEP 7, the presentation unit 80 may change the way to present the gaze event depending on the degree of interest or the determined emotion value of the occupant. As illustrated in FIG. 9, for example, the degree of interest may be divided into two levels, e.g., "high" and "moderate", and the emotion value of the occupant may be divided into two levels, e.g., "positive" and "negative".

If the degree of interest in the gaze event is high, the presentation unit 80 may present the gaze event to the occupant using both a sound and an image. If the degree of interest in the gaze event is moderate, the presentation unit 80 may present the gaze event to the occupant using either one of a sound and an image.

In STEP β, the controller CTL may determine the attribute of the gaze event determined in STEP 6. For example, the attribute acquiring unit 90 of the controller CTL may analyze an image of the gaze event captured by the exterior camera $V_1$ to specify whether the gaze target is a building, a person, or another object. In the third example embodiment, a known image analysis using, for example, an AI deep learning method may be employed thanks to the simple determination based on the three categories. Note that the division into three categories is a mere example, and the gaze target may be categorized into as many genres as possible using a known image recognition technology and a known matching technology. The genres may be known genres (e.g., a leisure facility and a convenience store) stored in the map data of the navigator N.

Alternatively, in STEP 7, the presentation unit 80 may change the way to present the gaze event depending on the attribute of the gaze event determined. For example, in a case where the attribute of the gaze event is a "building", the presentation unit 80 may present the gaze event to the occupant using an image. In a case where the attribute of the gaze event is a "person", the presentation unit 80 may present the gaze event to the occupant using a sound.

The presentation unit 80 may store the degree of interest in the gaze event, the attribute of the gaze event, and the emotion value of the occupant determined in STEP α or β, together with the determined gaze target data described above in the memory M. For example, as in a table of gaze event database $DB_2$ illustrated in FIG. 8, the data on the attribute of the gaze event, the data on the content of the gaze event, the data on the date, and the data on the person gazing at the gaze event may be stored as the determined gaze target data in the memory M.

Further, as in a table of gaze event database $DB_3$ illustrated in FIG. 9, the data on the degree of interest of the gaze event, the data on the emotion value of the occupant, and the data on how the presentation unit 80 has presented the gaze target to the occupant (process history) may be stored as the determined gaze target data in the memory M.

The vehicle controller VC may perform drive control of the vehicle. For example, the vehicle controller VC may switch the vehicle between being driven automatically and being driven manually by the driver. Accordingly, in a case where the controller CTL includes the interest degree determination unit 70, the vehicle controller VC may change the drive control on the basis of the results of the determination by the interest degree determination unit 70. For example, if the degree of interest in the gaze event is high, the vehicle controller VC may switch the vehicle to being automatically driven.

Some example embodiments of the technology are described in detail above with reference to the accompanying drawings. It should be appreciated that the example embodiments of the technology described above are mere examples and are not intended to limit the scope of the technology. For example, the features described in the second and third example embodiments may be common between all the example embodiments described above. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

One or more of the line-of-sight detector 10, the relative speed data acquiring unit 30, the navigator N, the curvature calculator 20, the threshold adjuster 40, and the gaze determination unit 50 in the gaze target detector 100 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the line-of-sight detector 10, the relative speed data acquiring unit 30, the navigator N, the curvature calculator 20, the threshold adjuster 40, and the gaze determination unit 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the line-of-sight detector 10, the relative speed data acquiring unit 30, the navigator N, the curvature calculator 20, the threshold adjuster 40, and the gaze determination unit 50 illustrated in FIG. 1.

The invention claimed is:

1. A gaze target detector comprising:
a line-of-sight detector configured to detect a line of sight of an occupant in a vehicle:
a relative speed data acquiring unit configured to acquire a relative speed between the vehicle and a gaze target at which the occupant is gazing;
a relative position data acquiring unit configured to acquire a relative position between the vehicle and the gaze target;
a curvature calculator configured to calculate a curvature of a traveling track of the vehicle;

a threshold adjuster configured to adjust a threshold on a basis of at least one of the relative speed, the relative position, or the curvature, the threshold being used to determine the gaze target; and a gaze determination unit configured to determine the gaze target as a gaze event when a time that the occupant continues to gaze at the gaze target is equal to or longer than the threshold, wherein the threshold adjuster decreases the threshold as an absolute value of the relative speed is larger.

2. The gaze target detector according to claim 1, further comprising:

an interest degree determination unit configured to determine a degree of interest of the occupant in the gaze event detected; and a presentation unit configured to present the gaze event to the occupant in a different way depending on the degree of interest determined.

3. The gaze target detector according to claim 2, wherein the presentation unit is configured to present the gaze event by at least either one of outputting a sound and displaying an image.

4. The gaze target detector according to claim 3, further comprising a vehicle controller configured to perform drive control of the vehicle in a different way depending on a result of determination by the interest degree determination unit.

5. The gaze target detector according to claim 2, further comprising an attribute acquiring unit configured to acquire an attribute of the gaze target, wherein the presentation unit is further configured to present the gaze target to the occupant in a different way depending on the attribute of the gaze target.

6. The gaze target detector according to claim 1, further comprising a seating position detector configured to detect a seating position of the occupant, wherein the threshold adjuster decreases the threshold as the seating position is more rearward of the vehicle.

7. The gaze target detector according to claim 1, wherein the threshold adjuster is configured to set different thresholds for a first gaze target residing on a right side with respect to an advancing direction of the vehicle and a second gaze target residing on a left side with respect to the advancing direction of the vehicle, the threshold for the first gaze target or the second gaze target whichever resides on a side to which the vehicle is turning being greater than the other threshold.

8. The gaze target detector according to claim 1, wherein the gaze event determined by the gaze determination unit is configured to be categorized for each occupant gazing at the gaze event and stored in a memory.

9. The gaze target detector according to claim 1, wherein the threshold adjuster decreases the threshold as the curvature is larger.

10. The gaze target detector according to claim 9, wherein the relative position includes an angle defined between a reference line extending in an advancing direction of the vehicle and a straight line connecting the vehicle and the gaze target, and the threshold adjuster decreases the threshold as an absolute value of the angle is larger.

11. The gaze target detector according to claim 1, wherein the relative position includes an angle defined between a reference line extending in an advancing direction of the vehicle and a straight line connecting the vehicle and the gaze target, and the threshold adjuster decreases the threshold as an absolute value of the angle is larger.

* * * * *